(12) United States Patent
Yun (10) Patent No.: US 7,116,376 B2
(45) Date of Patent: Oct. 3, 2006

(54) TV CARD AND COMPUTER SYSTEM HAVING THE SAME

(75) Inventor: Choi-Young Yun, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 525 days.

(21) Appl. No.: 10/186,715

(22) Filed: Jul. 2, 2002

(65) Prior Publication Data
US 2003/0076346 A1   Apr. 24, 2003

(30) Foreign Application Priority Data
Oct. 18, 2001   (KR) ................................ 2001-64395

(51) Int. Cl.
*H04N 7/00* (2006.01)
*H04N 5/44* (2006.01)
(52) U.S. Cl. .................. 348/552; 348/553; 348/734
(58) Field of Classification Search ................ 348/552, 348/725, 553, 734; 725/133, 131, 139, 141, 725/151, 153; 715/718; H04N 7/00, 5/44
See application file for complete search history.

(56) References Cited

U.S. PATENT DOCUMENTS

| 6,745,391 | B1 * | 6/2004 | Macrae et al. ................ 725/42 |
| 6,788,352 | B1 * | 9/2004 | Kim ............................ 348/553 |
| 2002/0122046 | A1 * | 9/2002 | Dischert et al. ............ 345/629 |

FOREIGN PATENT DOCUMENTS

| JP | 6-110590 | 4/1994 |
| KR | 1996-35235 | 10/1996 |
| KR | 1996-0065235 | 10/1996 |
| KR | 1998-39648 | 8/1998 |
| KR | 1999-025327 | 4/1999 |

OTHER PUBLICATIONS

*Office Action* from the Korean Intellectual Property Office issued in Applicant's corresponding Korean Patent Application No. 10-2001-0064395 (dated Aug. 23, 2004).

* cited by examiner

*Primary Examiner*—Sherrie Hsia
(74) *Attorney, Agent, or Firm*—Robert E. Bushness, Esq.

(57) ABSTRACT

A TV card for a computer, comprising a TV signal receiving part receiving a TV signal; a TV signal processing part processing the TV signal from the TV signal receiving part; a TV encoder converting a video signal outputted from the TV signal processing part into a TV video signal suitable for display, and directly transmitting the converted video signal to an output part of a TV; a control program storage part storing a control program controlling the TV signal received from the TV signal receiving part to be displayed on the TV through the TV signal processing part and the TV encoder; and a control part controlling the TV signal to be displayed on the TV through the TV signal processing part and the TV encoder on the basis of the control program when electric power is supplied thereto. With this configuration, it is possible not only to watch TV without booting the computer system but also to work with the computer system while watching TV.

14 Claims, 5 Drawing Sheets

TV CARD AND COMPUTER SYSTEM HAVING THE SAME

CLAIM OF PRIORITY

This application makes reference to, incorporates the same herein, and claims all benefits accruing under 35 U.S.C. § 119 from my application TV CARD AND COMPUTER SYSTEM WITH IT filed with the Korean Intellectual Property Office on 18 Oct. 2001 and there duly assigned Ser. No. 64395/2001.

BACKGROUND OF THE INVENTION

1. Field of the Invention

The present invention relates in general to a TV (television) card and a computer system having the same, and more particularly, to a TV card and a computer system, in which it is possible not only to watch TV without booting the computer system but also to work with the computer system while watching TV.

2. Description of the Related Art

A TV card is a device for watching TV through a computer system. These days, a TV card is widely used, which includes a PCI (Peripheral Component Interconnect) interface for being inserted in a slot provided on a main board (motherboard) of the computer system. Therefore, a user can watch TV through the computer system by installing the TV card in the computer system.

The TV card is comprised of a main chip, a tuner, and an I/O (Input/Output) port. The main chip is a main component for digitizing a received TV signal, overlaying a screen, capturing a moving picture, and superimposing a caption.

Figure 5:
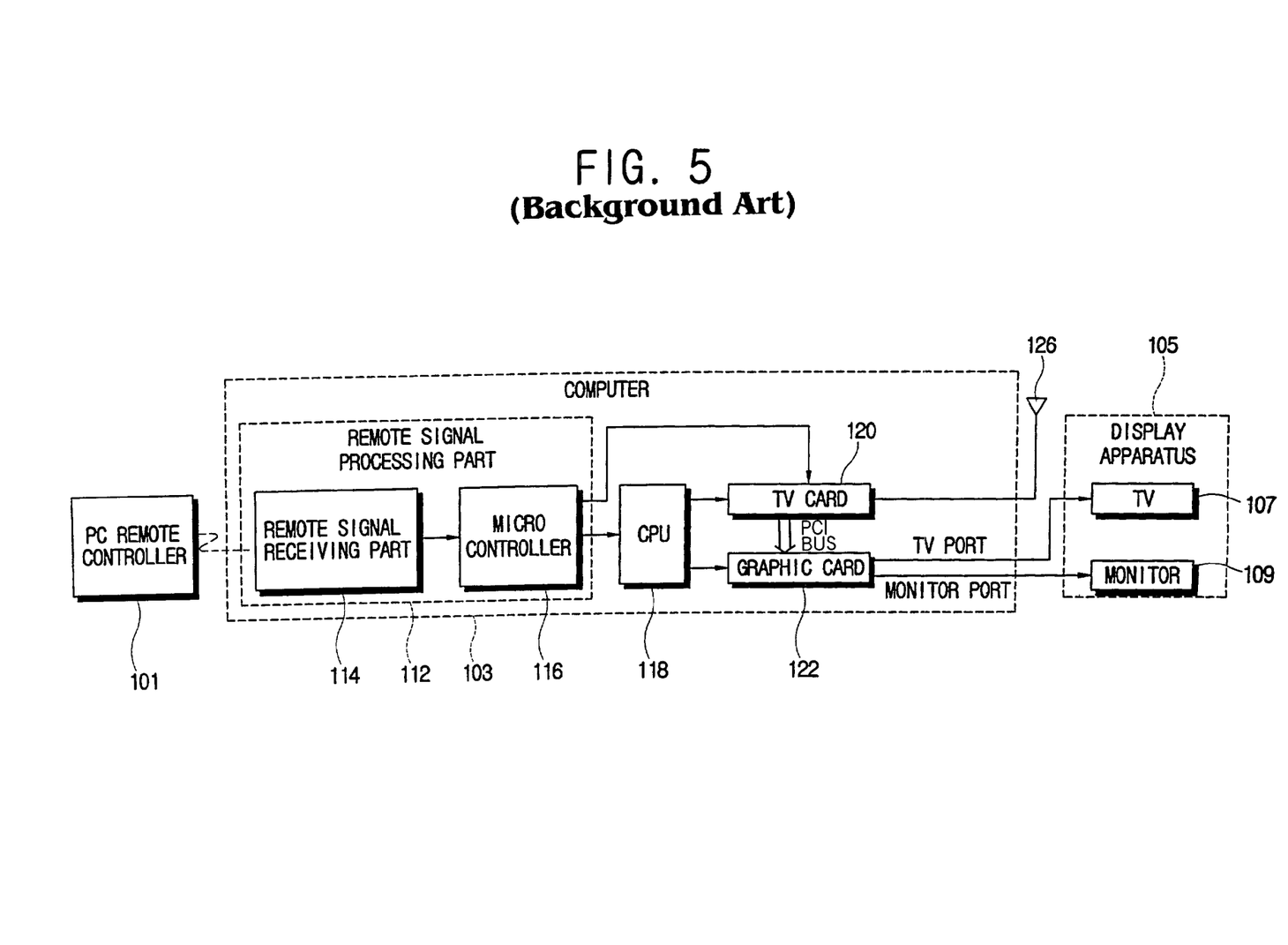
FIG. 5 is a control block an exemplary diagram of a computer system having a TV card.

FIG. 5 is a control block diagram of an exemplary computer system having the TV card. As shown therein, the computer system comprises a PC (Personal Computer) remote controller 101, a computer 103 in which various hardware components are installed, and a display apparatus 105 displaying a picture by a signal from the computer 103.

The PC remote controller 101 remotely controls the computer system by transmitting a remote signal to the computer 103 according to control of a user.

The computer 103 includes a CPU (Central Processing Unit) 118, a remote signal processing part 112 processing the remote signal received from the PC remote controller 101, a TV card 120 for receiving a TV signal, and a graphic card 122 transmitting a video signal to a display apparatus 105.

The remote signal processing part 112 is comprised of a remote signal receiving part 114 receiving the remote signal from the PC remote controller 101, and a micro controller 116 transmitting the remote signal received by the remote signal receiving part 114 to the CPU 118.

The TV card 120 converts the TV signal received through an antenna 126 into a digital TV signal, and transmits digital picture information to the graphic card 122 by adjusting the digital TV signal according to a resolution of the computer system. Herein, the digital video information is directly transmitted to the graphic card 122 through a PCI bus on the basis of a DMA (Direct Memory Access) transmittal mode.

The graphic card 122 receives the digital video signal based on the digital video information from the TV card 120, and supplies it to the display apparatus 105, thereby displaying the TV signal on the display apparatus 105.

Herein, because the graphic card 122 has a monitor port for outputting data of the computer 103 and a TV port for outputting the TV signal, a user can selectively connect a monitor 109 or a TV 107 with the monitor port or the TV port as necessary, respectively.

With this configuration, to watch TV through the computer system, a user first turns on the computer 103 by using a power button thereon (not shown) or the PC remote controller 101. According as the computer 103 is turned on, the CPU 118 performs BIOS (Basic Input/Output System) booting initializing every part, and then performs OS (Operating System) booting installing drivers to peripheral devices such as the TV card 120 and the graphic card 122 according to the operating system. After finishing the OS booting, the TV card 102 is controlled by the a corresponding OS driver when a user runs a TV application program.

The TV card 120 converts the TV signal received through antenna 126 into a digital TV signal, and transmits digital picture information to the graphic card 122 by adjusting the digital TV signal according to a resolution of the computer system, and then the graphic card 122 receives the digital video signal based on the digital video information from the TV card 120, and supplies it to the display apparatus 105, so that a user can watch TV through the display apparatus 105.

However, in this TV card, there is an inconvenience that a user must wait for the booting process to complete because the TV application program must be run under the OS in order to watch TV through the computer system, and it is difficult for a beginner to run the TV application program. Further, restraint is laid on running other application programs because the TV application program is previously running for displaying TV.

SUMMARY OF THE INVENTION

Accordingly, the present invention has been made keeping in mind the above-described shortcomings and user's need, and an object of the present invention is to provide a TV card and a computer system having the same, in which it is possible not only to watch TV without booting the computer system but also to work with the computer system while watching TV.

This and other objects of the present invention may be accomplished by the provision of a TV card for a computer, comprising a TV signal receiving part receiving a TV signal; a TV signal processing part processing the TV signal from the TV signal receiving part; a TV encoder converting a video signal outputted from the TV signal processing part into a TV video signal suitable for display, and directly transmitting the converted video signal to an output part of a TV; a control program storage part storing a control program controlling the TV signal received from the TV signal receiving part to be displayed on the TV through the TV signal processing part and the TV encoder; and a control part controlling the TV signal to be displayed on the TV through the TV signal processing part and the TV encoder on the basis of the control program when electric power is supplied thereto.

Preferably, the control program of the control program storage part includes a remote signal processing routine for processing a predetermined remote signal, and processes the remote signal through the remote signal processing routine when the remote signal is inputted.

Another object of the present invention is to provide a computer system having a power supply and a display apparatus, comprising the above described TV card; a selection part for selecting a TV function; and a control part controlling the power supply to supply electric power to the TV card and the display apparatus when the TV function is selected through the selection part.

Preferably, the selection part includes a remote controlling unit and a remote signal receiving part receiving a remote signal from the remote controlling unit, and the control part controls the TV card and the power supply on the basis of a control signal outputted from the remote signal receiving part.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

The present invention will be described in more detail with reference to the accompanying drawings.

Figure 1:
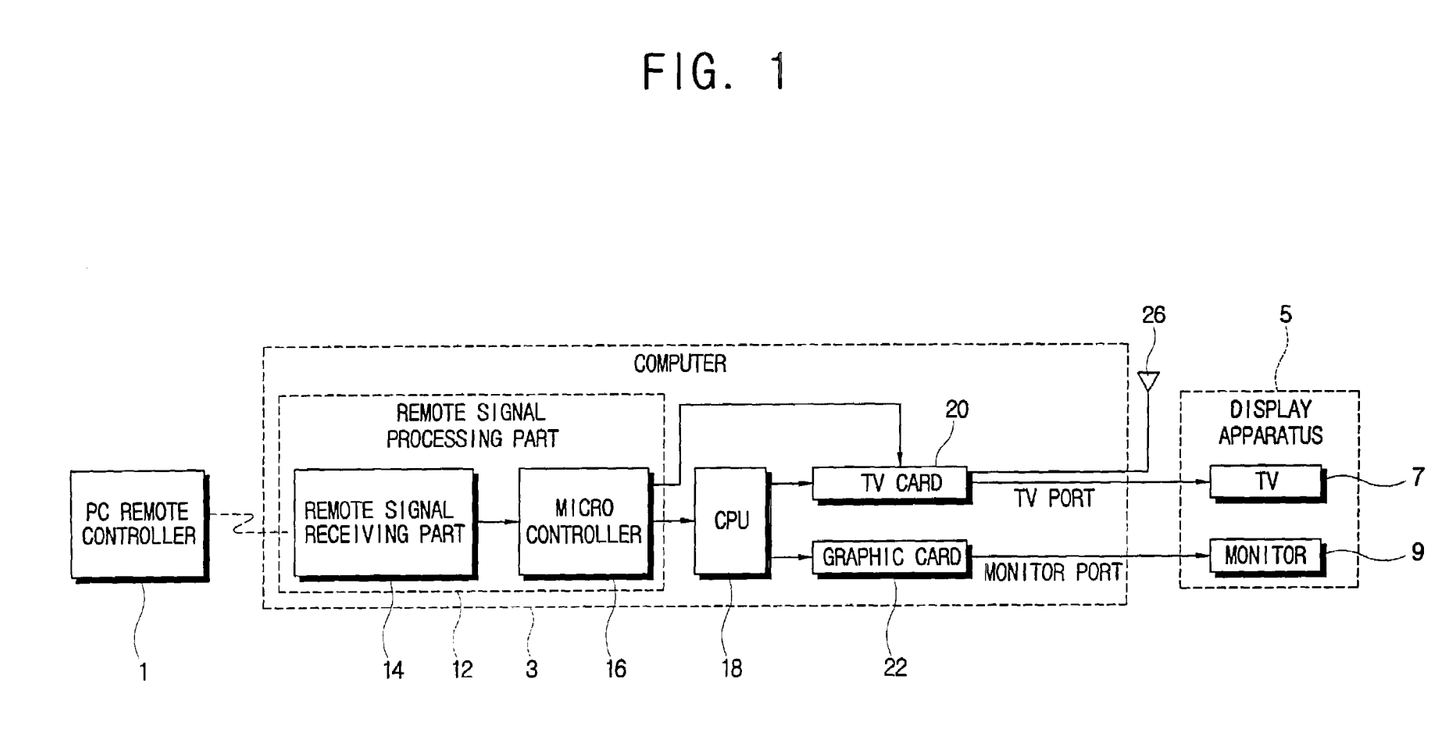
FIG. 1 is a control block diagram of a computer system having a TV card according to a first embodiment of the present invention.

As shown in FIG. 1, a computer system comprises a PC (Personal Computer) remote controller 1, a computer 3 in which a TV card 20 is installed, and a display apparatus 5 displaying a picture corresponding to a signal output from the computer 3.

The PC remote controller 1 remotely controls the computer system by transmitting a remote signal to the computer 3 according to control of a user.

The computer 3 includes a CPU (Central Processing Unit) 18, a remote signal processing part 12 processing the remote signal received from the PC remote controller 1, the TV card 20 for receiving a TV signal, and a graphic card 22 transmitting a video signal to display apparatus 5.

The remote signal processing part 12 is comprised of a remote signal receiving part 14 receiving the remote signal from the PC remote controller 1, and a micro controller 16 controlling transmission of the remote signal received by the remote signal receiving part 14. The micro controller 16 selectively transmits the received remote signal to the CPU 18 or the TV card 20 according to selection of the PC remote controller 1.

The TV card 20 converts the TV signal received through an antenna (cable, satellite, VCR, DVD, or camera) 26 into the TV video signal suitable for being displayed on a TV 7 and transmits it to the TV 7, as will be explained with respect to FIG. 2. The graphic card 22 transmits a monitor video signal for displaying the output of the CPU 18 on monitor 9.

Figure 2:
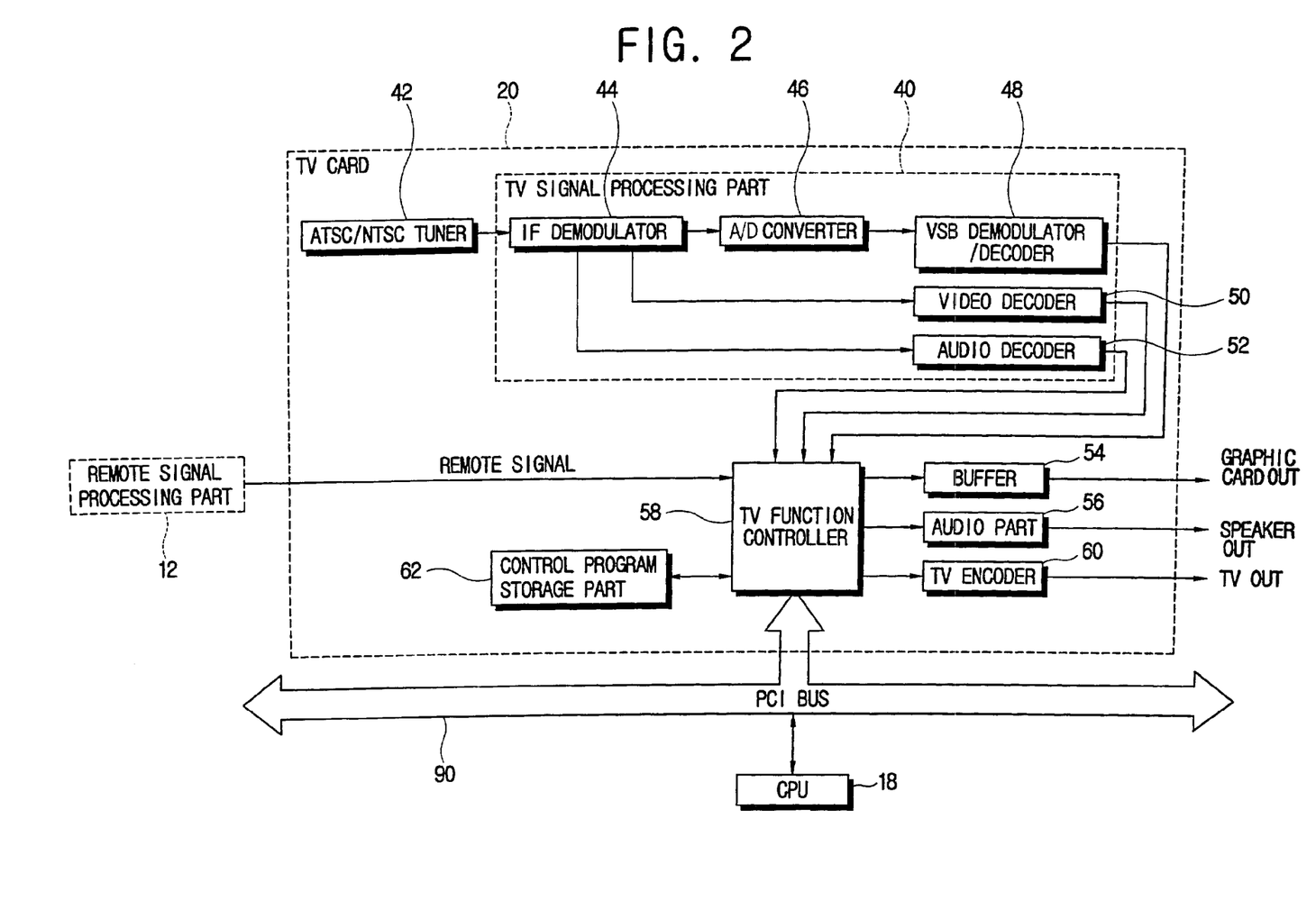
FIG. 2 is a control block diagram of a TV card according to the first embodiment of the present invention.

As shown in FIG. 2, the TV card 20 is comprised of an ATSC/NTSC (Advanced Television Systems Committee/ National Television Systems Committee) tuner 42 for receiving the TV signal, a TV signal processing part 40 demodulating and decoding the TV signal received through the ATSC/NTSC tuner 42 according to the kind of TV signal, a buffer 54 for transmitting a video signal of the TV signals processed by the TV signal processing part 40 to the graphic card 22, an audio part 56 outputting an audio signal, a TV encoder 60 encoding the TV video signal to be displayed on the TV 7, a control program storage part 62 storing a control program controlling each function of the TV card 20 therein, and a TV function controller 58 controlling every part of the TV card 20 in response to the control program.

The ATSC/NTSC tuner 42 selectively receives the TV signal corresponding to a chosen channel among the TV signal transmitted from a broadcasting station channel. That is, the chosen TV signal is selectively received by adjusting a receiving frequency band. Herein, the ATSC is a transmittal mode for broadcasting digital TV, and the NTSC is a transmittal mode for broadcasting analog TV. Thus, the TV card 20 can receive both the digital and analog TV signals.

The TV signal processing part 40 demodulates and decodes the TV signal received from the ATSC/NTSC tuner 42, thereby converting the TV signal into a digital signal for the computer system. The TV signal processing part 40 is comprised of an IF (Intermediate Frequency) demodulator 44 demodulating the TV signal at an intermediate frequency, an A/D converter 46 converting the TV signal demodulated by the IF demodulator 44 into the digital signal, and a VSB (Vestigial Side Band) demodulator/decoder 48 demodulating and decoding the digital signal converted by the AD converter 46 at a vestigial side band. Thus, in the case of the TV signal of the ATSC transmittal mode, the TV signal is converted into digital data for the computer system through the IF demodulator 44, the AD converter 46 and the VSB demodulator/decoder 48.

Further, the TV signal processing part 40 includes a video decoder 50 and an audio decoder 52 respectively decoding the video and audio signals of the IF demodulator 44 and outputting analog image and audio signals, respectively. Therefore, in the case of the TV signal of the NTSC transmittal mode, the video and audio signals are decoded by the video and audio decoders 50 and 52 into analog signals for the computer system.

The buffer 54 temporarily stores the digital data transmitted from the TV signal processing part 40 until the data has a predetermined size. The TV function controller 58 transmits the digital data stored in the buffer 54 to the graphic card 22 when the buffer 54 stores the digital data of the predetermined size. Thus, the TV signal is displayed on the monitor 9 through the graphic card 22.

The TV function controller 58 directly applies video signals and sound signals to a TV 7 by controlling TV encoder 60 and audio part 56 after processing the video signals and sound signals in a proper digital format. The audio part 56 outputs audio data out of the digital data transmitted from the TV function controller 58 to a speaker to produce sound. The TV encoder 60 encodes the digital data transmitted from the TV into the TV video signal, and directly outputs it to the TV 7.

The TV function controller 58 can output the TV video signal transmitted from the TV signal processing part 40 to the TV 7 by utilizing the control program stored in the control program storage part 62. At this time, reception of the TV signal and conversion of the TV signal for suitable display on TV 7 are accomplished by the control program (such reception and conversion by a control program is well known in the art and will not be further described herein) and then the TV video signal is encoded by the TV encoder 60, so that the TV card 20 operates independently of the computer system.

Further, the TV function controller 58 can output the TV video signal transmitted from the TV signal processing part 40 to the monitor 9 through the graphic card 22 provided in the computer system. At this time, the TV function controller 58 outputs the audio signal out of the TV signal processed by the TV signal processing part 40 to the speaker.

The above processes are accomplished by allowing the TV function controller 58 of the TV card 20 to control every part of TV card 20 on the basis of the control program stored in the control program storage part 62. Consequently, the TV card 20 can be independently operated by the control program thereof without control of the CPU 18.

The TV function controller 58 accomplishes the control on the basis of the remote signal of the PC remote controller 1 processed by the remote signal processing part 12. For instance, when a user turns up/down volume by using the remote controller 1, the TV function controller 58 controls the output of the audio part 56.

Further, the TV function controller 58 accomplishes the control on the basis of the control signal of the CPU 18. Therefore, when a user controls the TV function by using an input unit of the computer system such as a keyboard, a mouse, etc., the TV function controller 58 receives the control signal of the CPU 18 through the PCI bus 90.

With this configuration, if the TV card 20 is turned on according as electric power is supplied to the computer 3, the TV function controller 58 controls the TV signal processing part 40 to convert the TV signal inputted through the ATSC/NTSC tuner 42 into the digital signal according to the control program stored in the control program storage part 62, and controls the TV encoder 60 to encode the digital signal and to output it to the TV 7.

That is, while the TV card 20 operates independently of the CPU 18, the graphic card 22 outputs data calculated by the CPU 18 to the monitor 9. Therefore, both the monitor 9 and the TV 7 can be connected to the computer 3, and thus a user can use the computer system, while watching the TV 7.

When a user controls the TV function by using the PC remote controller 1, the remote signal processing part 12 directly transmits the received remote signal to the TV card 20, and then the remote signal is directly processed by the TV function controller 58 inside the TV card 20, thereby allowing a user to turn up/down the volume, to set up the screen, or etc.

Further, when a user controls the TV function by using the input unit such as the keyboard, the mouse, etc. connected to the computer system, the CPU 18 transmits the control signal based on the user input to the TV function controller 58 through the PCI bus 90, thereby allowing a user to control the TV function.

Figure 3:
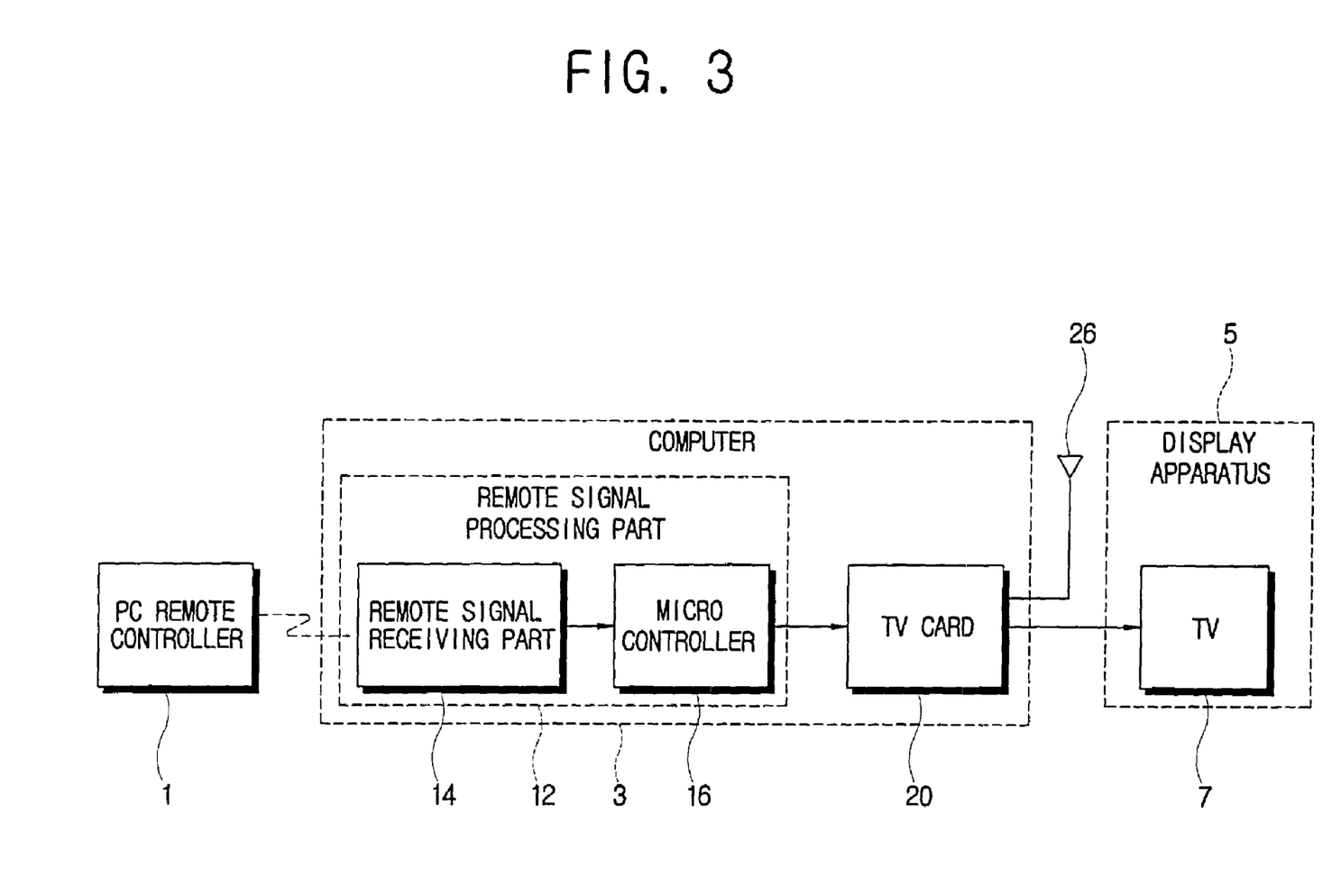
FIG. 3 is a control block diagram of a computer system according to a second embodiment of the present invention.

In the case of watching TV without using the computer system, the computer system operates as shown in FIG. 3. As shown therein, according as a user pushes a TV button of the PC remote controller 1, and electric power is supplied to certain components for processing the TV signal from a separate power supplying part (not shown).

That is, the electric power is supplied to only the remote signal processing part 12, the TV card 20 and the display apparatus 5. Then, the TV function controller 58 of the TV card 20 converts the TV signal and outputs it to the TV 7 on the basis of the control program. The remote signal for controlling the TV function is generated from the PC remote controller 1 and directly transmitted to the TV card 20 through the remote signal receiving part 14 and the micro controller 16 of the remote signal processing part 12, and the TV function controller 58 controls the TV function such as volume and a channel on the basis of the received remote signal. Thus, it is possible to watch TV without booting the computer 3.

Figure 4:
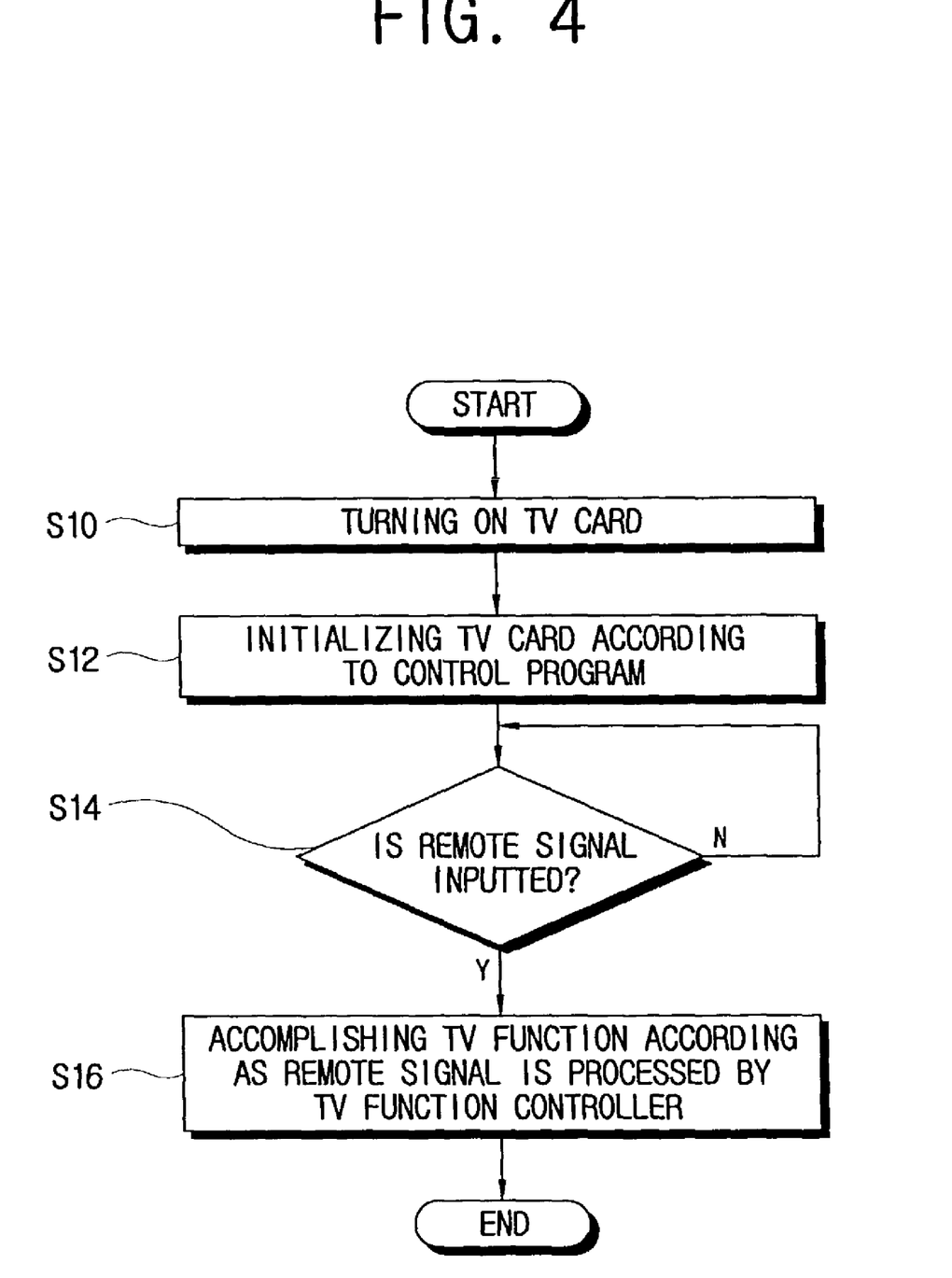
FIG. 4 is a control flow chart of the TV card according to the second embodiment of the present invention.

As shown in FIG. 4, when a user pushes a computer button or the TV button of the remote controller 1, the TV card 20 is turned on (S10). Then, the TV function controller 58 loads the control program from the control program storage part 62 and initializes every part of the TV card 20 (S12). According as the TV card 20 is initialized, the TV function controller 58 is suspended until the remote signal is inputted from the PC remote controller 1 (S14). If the remote signal is inputted to the TV card 20, the TV function controller 58 processes the remote signal on the basis of the control program, thereby accomplishing the TV function (S16).

As described above, the TV card according to the present invention comprises a control program and a TV encoder which encodes a TV video signal in order to directly display a TV signal on a TV, thereby processing the TV signal independently of an operating system of a computer so as to displaying it on the TV. Consequently, the monitor for displaying data of a computer system, while watching TV, is connected to the computer, and thus a user can use them respectively.

Further, according to the present invention, if a user wants to only watch TV, electric power is supplied to only certain components for processing the TV signal, and the control program is provided inside the TV card, so that a user can watch TV without booting the computer.

As described above, the present invention provides a TV card and a computer system having the same, in which it is possible not only to watch TV without booting the computer system but also to work with the computer system while watching TV.

Although the preferred embodiments of the present invention have been disclosed for illustrative purpose, those skilled in the art will appreciate that various modifications, additions and substitutions are possible, without departing from the scope and spirit of the invention as disclosed in the accompanying claims.

What is claimed is:

1. A television (TV) card for a computer, said TV card having electric power supplied thereto absent said computer being booted, said TV card comprising:
    a TV signal receiving part receiving a TV signal;
    a TV signal processing part processing the TV signal from the TV signal receiving part;
    a TV encoder converting a video signal outputted from the TV signal processing part into a TV video signal suitable for display, and directly transmitting the converted video signal to an input part of a TV;
    a control program storage part storing a control program controlling the TV signal received from the TV signal receiving part to be displayed on the TV through the TV signal processing part and the TV encoder, the control program of the control program storage part includes a remote signal processing routine for processing a predetermined remote signal, and processes the remote signal through the remote signal processing routine when the remote signal is inputted; and
    a control part controlling the TV signal to be displayed on the TV through the TV signal processing part and the TV encoder on the basis of the control program.

2. A computer system having a power supply and a display apparatus including a TV and a monitor, and a graphic card outputting a video signal to the monitor, comprising:

a TV card comprising:
- a TV signal receiving part receiving a TV signal,
- a TV signal processing part outputting the video signal to the graphic card after processing the TV signal from the TV signal receiving part,
- a TV encoder converting the video signal outputted from the TV signal processing part into a TV video signal suitable for display, and directly transmitting the converted video signal to an output part of a TV,
- a control program storage part storing a control program controlling the TV signal received from the TV signal receiving part to be displayed on the TV through the TV signal processing part and the TV encoder, the control program stored in the control program storage part of the TV card includes a remote signal processing routine for processing a predetermined remote signal, and processes the remote signal through the remote signal processing routine when the remote signal is inputted, and
- a first control part controlling the TV signal to be displayed on the TV through the TV signal processing part and the TV encoder on the basis of the control;

a selection part for selecting a TV function; and a second control part controlling the supply of electric power to the TV card and the display apparatus when the TV function is selected through the selection part.

3. The computer system according to claim 2, wherein the selection part includes a remote controlling unit and a remote signal receiving part receiving a remote signal from the remote controlling unit, and the second control part controls the electric power supplied to the TV card on the basis of a control signal outputted from the remote signal receiving part.

4. A television card in a computer remotely controlled by a personal computer remote controller, said television card comprising:
- a television signal tuner receiving a television signal;
- a television signal processor processing said television signal from said television signal tuner;
- a television encoder converting a video signal output from said television signal processor into a converted video signal suitable for display on a television, and directly transmitting the converted video signal to an input of said television;
- a control program storage part storing a control program; and
- a control part controlling, on the basis of said control program, said television signal tuner, said television signal processor and said television encoder, said television card having electric power supplied thereto absent said computer being booted.

5. The television card as set forth in claim 4, wherein said control program of said control program storage part includes a remote signal processing routine for processing a remote control signal generated by said personal computer remote controller.

6. The television card as set forth in claim 4, said television signal processor comprising:
- an intermediate frequency demodulator demodulating said television signal from said television signal tuner;
- an audio decoder decoding audio signals output from said intermediate frequency demodulator, said audio decoder outputting analog audio signals; and
- a video decoder decoding video signals output from said intermediate frequency demodulator, said video decoder outputting analog video signals.

7. The television card as set forth in claim 6, said television signal processor further comprising:
- an analog-to-digital converter converting a demodulated television signal output from said intermediate frequency demodulator into a digital video signal; and
- a vestigial sideband demodulator-decoder demodulating and decoding the digital video signal at a vestigial side band to output digital data for use by the computer.

8. The television card as set forth in claim 7, further comprising:
- a buffer temporarily storing the digital data output from the vestigial sideband demodulator-decoder until the stored digital data has a predetermined size, said control part outputting the stored digital data from said buffer to a graphics card of said computer when has said predetermined size.

9. The television card as set forth in claim 6 further comprising:
- said control part receiving said analog audio and video signals output from said audio and video decoders, said control part converting said analog audio and video signals into a desired digital format and outputting converted digital audio signals and converted digital video signals; and
- an audio part receiving said converted digital audio signals and outputting audio signals suitable for input to speakers of said television.

10. The television card as set forth in claim 4, said television signal processor further comprising:
- an analog-to-digital converter converting a demodulated television signal output from an intermediate frequency demodulator into a digital video signal; and
- a vestigial sideband demodulator-decoder demodulating and decoding the digital video signal at a vestigial side band to output digital data for use by the computer.

11. The television card as set forth in claim 10, further comprising:
- a buffer temporarily storing the digital data output from the vestigial sideband demodulator-decoder until the stored digital data has a predetermined size, said control part outputting the stored digital data from said buffer to a graphics card of said computer when has said predetermined size.

12. A computer system having a power supply and a display apparatus, comprising:
- a television card comprising:
  - a television signal tuner receiving a television signal;
  - a television signal processor processing said television signal from said television signal tuner;
  - a television encoder converting a video signal output from said television signal processor into a converted video signal suitable for display on a television, and directly transmitting the converted video signal to an input of said television;
  - a control program storage part storing a control program; and
  - a control part controlling, on the basis of said control program, said television signal tuner, said television signal processor and said television encoder;
- a selection part for selecting a television function; and
- a power control part controlling the supply of electric power to the television card and the display apparatus when the television function is selected through the selection part, said television card having electric power supplied thereto absent said computer being booted.

13. The computer system as set forth in claim 12, wherein said control program of said control program storage part includes a remote signal processing routine for processing a remote control signal generated by said personal computer remote controlling unit.

14. The computer system as set forth in claim 12, wherein said selection part includes a remote controlling unit and a remote signal receiving part receiving a remote signal from said remote controlling unit, and said control part controls said electric power supplied to said television card on the basis of a control signal output from said remote signal receiving part.

* * * * *

UNITED STATES PATENT AND TRADEMARK OFFICE
CERTIFICATE OF CORRECTION

PATENT NO. : 7,116,376 B2  
APPLICATION NO. : 10/186715  
DATED : October 3, 2006  
INVENTOR(S) : Choi-Young Yun Page 1 of 1

It is certified that error appears in the above-identified patent and that said Letters Patent is hereby corrected as shown below:

On Title Page,
please correct:

Item (74)    Attorney, Agent, or Firm:

From "Robert E. Bushness, Esq."

To    -- Robert E. Bushnell, Esq. --

Signed and Sealed this

Nineteenth Day of December, 2006

JON W. DUDAS  
*Director of the United States Patent and Trademark Office*